United States Patent [19]

Suzuki

[11] Patent Number: 4,552,241

[45] Date of Patent: Nov. 12, 1985

[54] FOUR-WHEEL DRIVE SYSTEM WITH CENTER DIFFERENTIAL LOCK CONTROL RESPONSIVE TO RPM DIFFERENCE

[75] Inventor: Kunihiko Suzuki, Sagamihara, Japan

[73] Assignee: Nissan Motor Company, Ltd., Japan

[21] Appl. No.: 601,002

[22] Filed: Apr. 16, 1984

[30] Foreign Application Priority Data

May 23, 1983 [JP] Japan .................................. 58-90391

[51] Int. Cl.[4] ............................................ B60K 17/34
[52] U.S. Cl. ..................................... 180/249; 180/197
[58] Field of Search ................. 180/248, 249, 197, 250

[56] References Cited

U.S. PATENT DOCUMENTS

3,411,601 11/1968 Arkus-Duatov ..................... 180/248
4,298,085 11/1981 Moroto et al. ....................... 180/247
4,452,331 6/1984 Lunn et al. ........................... 180/247
4,466,502 8/1984 Sakai ................................... 180/248
4,484,653 11/1984 Horikoshi et al. .............. 180/197 X

Primary Examiner—Richard E. Gluck
Attorney, Agent, or Firm—Lane and Aitken

[57] ABSTRACT

A four-wheel drive system of a vehicle has a center differential between front wheels and rear wheels, and means for restraining or locking the center differential. The four-wheel drive system is combined with a control system for automatically locking the center differential when the difference between an average rotational speed of the right and left front wheels and an average rotational speed of the right and left rear wheels becomes equal to or larger than a predetermined value.

16 Claims, 9 Drawing Figures

FOUR-WHEEL DRIVE SYSTEM WITH CENTER DIFFERENTIAL LOCK CONTROL RESPONSIVE TO RPM DIFFERENCE

BACKGROUND OF THE INVENTION

The present invention relates to a four-wheel drive motor vehicle of a type having a center differential between the front and rear wheels, and means for restraining or locking the center differential. More specifically, the present invention relates to a control system for locking a center differential of a four-wheel drive system in accordance with a rotational speed difference between the front wheels and the rear wheels.

A four-wheel drive vehicle is superior in ability of hill climbing and ability of rough road driving. If, however, all four wheels are always driven at the same speed, a four-wheel drive vehicle cannot be turned smoothly. During a turn with a large steering angle of steerable wheels, the front wheel of an inner or outer side must travel along a circle having a large radius and the rear wheel of the same side must travel along a small circle. Because of this difference in turning radius, there arises a large difference between a rotation speed (an average rotation speed, to be exact) of the front wheels and a rotation speed (an average rotation speed) of the rear wheels. As a result, the steering becomes heavy, the tendency to understeer is increased, and the vehicle cannot be turned without abnormal tire friction (called tight corner brake) which tends to brake the vehicle and cause an engine stall.

To overcome these handling and tire friction problems, some four-wheel drive systems use a center differential between front and rear wheels. If, however, one of the four wheels run on a muddy place, the center differential coacts with a rear or front differential between right and left wheels, so that the torque cannot be transmitted to the other three wheels, and the vehicle cannot escape from the muddy place.

In view of this problem, some four-wheel drive systems are further provided with means (a lockup mechanism or a non-slip differential mechanism) for locking the center differential. One example is shown in Japanese patent provisional publication No. 57-114727.

SUMMARY OF THE INVENTION

It is an object of the present invention to improve a four-wheel drive vehicle of a type having a center differential and means for locking or restraining the center differential.

According to the present invention, a four-wheel drive vehicle comprises an engine, front right and left wheels, rear right and left wheels, a four-wheel drive system and a control system. The four-wheel drive system is capable of transmitting power from the engine to the front wheels and the rear wheels. The four-wheel drive system comprises a center differential connected between the front wheels and the rear wheels for absorbing a rotational speed difference between the front wheels and the rear wheels, and restraining means capable of holding the center differential in a restrained condition in which the differential action of the center differential is restrained, and in a released condition in which the differential action of the center differential is allowed. The four-wheel drive system further comprises front wheel side rotating means connected between the center differential and the front wheels, and rear wheel side rotating means connected between the center differential and the rear wheels. The center differential allows the front wheel side rotating means and the rear wheels side rotating means to rotate at different speeds when the center differential is in the released condition. The control system comprises front speed sensing means for sensing a rotational speed of the front wheel side rotating means, rear speed sensing means for sensing a rotational speed of the rear wheel side rotating means, condition sensing means for detecting whether the center differential is in or out of the restrained condition, and control means connected with both of the front and rear speed sensing means and the condition sensing means. The control means controls the restraining means in accordance with signals of the front and rear speed sensing means and the condition sensing means. The control means commands the restraining means to bring the center differential to the restrained condition if the difference between the rotational speed of the front wheel side rotating means and the rotational speed of the rear wheel side rotating means is equal to or larger than a predetermined value and at the same time the center differential is out of the restrained condition.

In one embodiment, the front wheel side rotating means comprises a front right axle shaft connected with the front right wheel and a front left axle shaft connected with the front left wheel, and the rear wheel side rotating means comprises a rear right axle shaft connected with the rear right wheel and a rear left axle shaft connected with the rear left wheel. The front speed sensing means senses rotational speeds of the front right wheel and the front left wheel, and the rear speed sensing means senses rotational speeds of the rear right wheel and the rear left wheel. The control means commands the restraining means to bring the center differential to the restrained condition if the difference between an average rotational speed of the front wheels and an average rotational speed of the rear wheels is equal to or larger than a predetermined value and at the same time the center differential is out of the restrained condition.

In another embodiment, the front wheel side rotating means is a differential case of a front differential connected between the front wheels for absorbing a rotational speed difference between the front wheels, and the rear wheel side rotating means is a differential case of a rear differential connected between the rear wheels for absorbing a rotational speed difference between the rear wheels.

In still another embodiment, the front wheel side rotating means and the rear wheel side rotating means are side gears of the center differential.

DETAILED DESCRIPTION OF THE INVENTION

Figure 2:
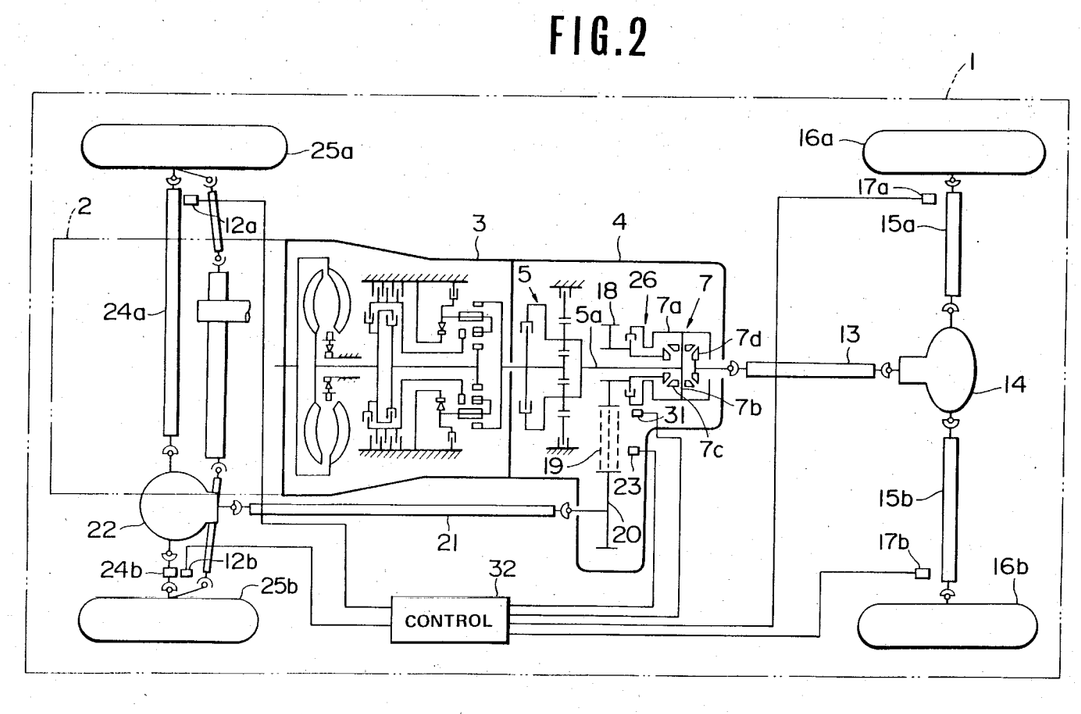
FIG. 2 is a schematic view of a four-wheel drive vehicle of a first embodiment of the present invention.

A first embodiment of the present invention is shown in FIG. 2. An engine 2 is supported on a vehicle body 1. The engines is connected to a transmission 3. The transmission 3 is connected to a transfer or transfer case 4. The transfer 4 has a high-low two-speed change unit 5. The transmission 3 is connected to the high-low change unit 5 of the transfer 4. The high-low change unit 5 has an output shaft 5a. The transfer 4 further has a center differential unit 7. The output shaft 5a of the high-low unit 5 is connected to the center differential unit 7. The center differential unit 7 has a differential case 7a, a pinion shaft 7b fixed to the differential case 7a, two differential pinions 7c rotatably mounted on the pinion shaft 7b, and front and rear side gears 7d which mesh with the differential pinions 7c.

The rear side gears 7d is connected to one end of a rear propeller shaft 13. The other end of the rear propeller shaft 13 is connected with a rear differential unit 14. The rear differential unit 14 is connected to rear wheels 16a and 16b through rear axle shafts 15a and 15b. The rear differential unit 14 allows the right and left rear wheels 16a and 16b to rotate at different speeds, and thereby absorbs a rotational speed difference between the right and left rear wheels 16a and 16b.

There are provided rear wheel rpm sensors 17a and 17b mounted on the vehicle body 1 near the rear axle shafts 15a and 15b, respectively. The rear wheel rpm sensors 17a and 17b, respectively, sense rotational speeds of the right and left rear wheels 16a and 16b in revolutions per unit time.

The front side gear 7d of the center differential unit 7 is connected with a first chain wheel 18 placed coaxially with the front side gear 7d. The first chain wheel 18 is connected with a second chain wheel 20 by a chain belt 19. A shaft of the second chain wheel 20 is connected with one end of a front propeller shaft 21. The other end of the front propeller shaft 21 is connected to a front differential unit 22. The front differential unit 22 is connected with front wheels 25a and 25b through front axle shafts 24a and 24b, respectively. The front differential unit 22 allows the right and left front wheels 25a and 25b to rotate at different speeds, and thereby absorbs a rotational speed difference between the right and left front wheels 25a and 25b.

There are provided front wheel rpm sensors 12a and 12b mounted on the vehicle body near the front axle shafts 24a and 24b, respectively. The front wheel rpm sensors 12a and 12b, respectively, sense rotational speeds of the right and left front wheels 25a and 25b in revolutions per unit time.

Figure 3:
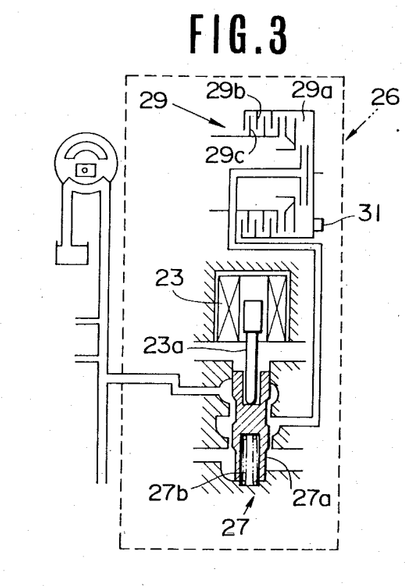
FIG. 3 is a fragmentary sectional schematic view of a center differential restraining means used in the vehicle of FIG. 2.

The transfer 4 further has a center differential restrain unit 26 disposed between the differential case 7a of the center differential unit 7 and the first chain wheel 18. As shown in FIG. 3, the center differential restrain unit 26 has a center differential control valve 27 connected with a hydraulic system of the vehicle such as the hydraulic system of the transmission 3. The center differential control valve 27 has a spool 27a and a spring 27b. The center differential restrain unit 26 further has a solenoid 23 having an iron core 23a for moving the spool 27a against the force of the spring 27b. The solenoid 23 serves as an actuator of a control system. The center differential restrain unit 26 further has a hydraulic type multiple disc clutch 29. The clutch 29 is operated by an oil pressure of an oil chamber 29a. The oil chamber 29a is fluidly connected with a port of the center differential control valve 27. The multiple disc clutch 29 has a group of first clutch plates 29b and a group of second clutch plates 29c. One of the two groups is connected with the differential case 7a of the center differential unit 7. The other is connected with the first chain wheel 18. The center differential control valve 27 can move the spool 27a with the iron core 23a in accordance with the current passing through the solenoid 23, and thereby control the fluid pressure in the oil chamber 29a by controlling the fluid flow. The clutch 29 is frictionally engaged when the oil pressure in the oil chamber 29a is increased by moving the spool 27a downwards against the spring 27b. The clutch 29 is in a slipping state when the oil pressure in the oil chamber 29a is decreased by moving the spool 27a upwards in FIG. 3 with the aid of the spring 27b. The clutch 29 is disengaged when the oil is drained from the oil chamber 29a.

There is further provided a sensor 31 for detecting the condition of the center differential 7. In this embodiment, the differential condition sensor 31 detects whether the clutch 29 is engaged or not by monitoring the oil pressure in the oil chamber 29a.

Figure 4A:
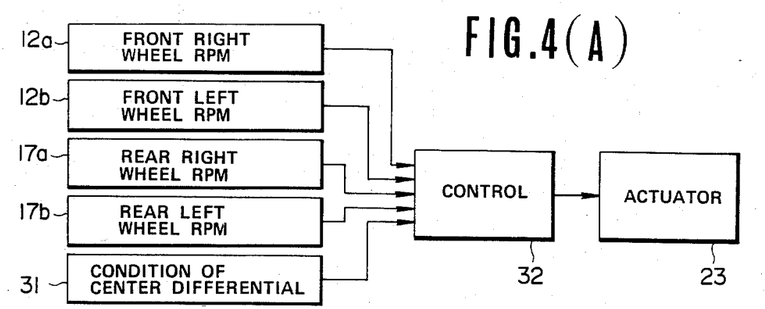
FIG. 4A is a block diagram of a control system of the first embodiment.

A control unit or circuit 32 is connected with the front wheel rpm sensors 12a and 12b, the rear wheel rpm sensors 17a and 17b, and the differential condition sensor 31 for receiving signals from these sensors. The control circuit 32 produces a control signal in accordance with the signals of these sensors, and sends the control signal to the solenoid (actuator) 23. Thus, a control system is formed as shown in FIG. 4(A).

Figure 1:
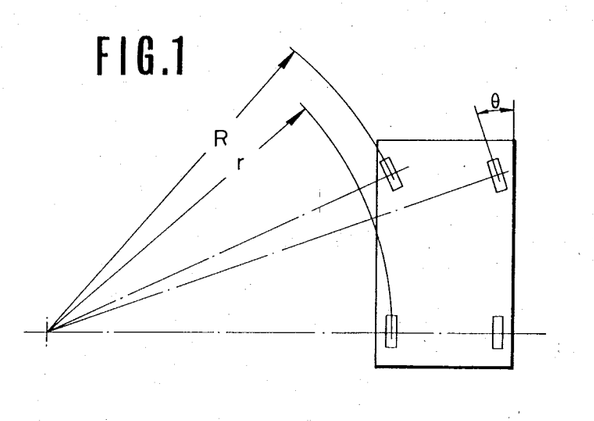
FIG. 1 is a plan view of a vehicle, for showing a turning radius difference between front wheels and rear wheels when a steering angle of steerable wheels are large.

When the center differential restrain unit 26 is not actuated, the center differential unit 7 works in the following manner. When the steering angle θ of the steerable front wheels 25a and 25b is increased, the radii (R) of arc-shaped paths traveled by the front wheels 25a and 25b become largely different from the radii (r) of arc-shaped paths traveled by the rear wheels 16a and 16b, as shown in FIG. 1. In FIG. 1, only the paths of the inside front and rear wheels are shown. Consequently, there arises a large difference between an average rotation speed of the front wheels 25a and 25b and an average rotation speed of the rear-wheels 16a and 16b. The center differential 7 in its released state absorbs this average rotation speed difference between the front and rear wheels, so that the vehicle can turn smoothly though the steering angle θ is large.

If the vehicle travels on an off road with the center differential 7 being held in its released position, and any one of the four wheels (25a, for example) sinks in a mire and begins slipping, then all the other three wheels 25b, 16a and 16b lose their power for driving the vehicle because of the cooperation of the center differential 7 and the front differential 22 or the rear differential 14. As a result, the vehilcle cannot escape from the mire. In this case, the wheel 25b paired with the slipping wheel 25a can hardly rotate because of road resistance, so that there arises a large difference of rotational speed between the right and left wheels 25a and 25b. This rotational speed difference is absorbed by the front differential 22 disposed between the wheels 25a and 25b. The rear wheels 16a and 16b can hardly rotate because of road resistance. Almost all the rotation of the output shaft 5a of the high-low unit 5 is wasted on rotating the slipping wheel 25a. The front propeller shaft 21 rotates fast but the rear propeller shaft 13 remains almost stationary. There arises a large rotational speed difference between the front wheel side and the rear wheel side of the center differential 7.

Figure 4B:
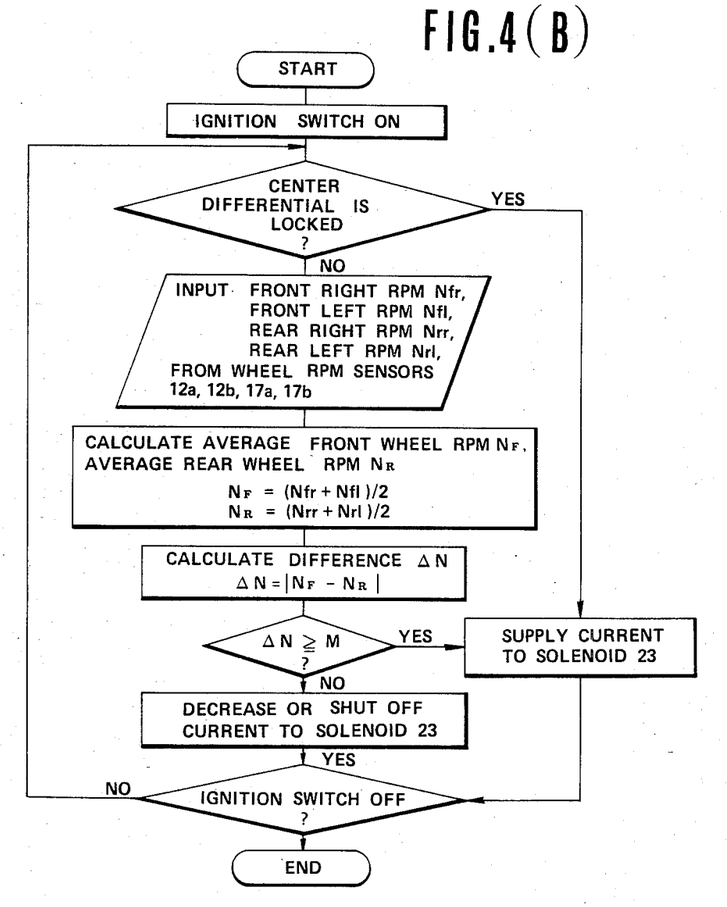
FIG. 4(B) is a flowchart for the control system of the FIG. 4(A).

This rotational speed difference is monitored by the control system of the present invention. In the first embodiment, the front wheel rpm sensors 12a and 12b sense, respectively, the rotational speed of the front right axle shaft 24a, i.e. the rotational speed (Nfr) of the front right wheel 25a, and the rotational speed of the front left axle shaft 24b, i.e. the rotational speed (Nfl) of the front left wheel 25b. The rear wheel rpm sensors 17a and 17b sense, respectively, the rotational speed of the rear right axle shaft 15a, i.e. the rotational speed (Nrr) of the rear right wheel 16a, and the rotational speed of the rear left axle shaft 15b, i.e. the rotational speed (Nrl) of the rear left wheel 16b. The control unit 32 receives signals indicative of the sensed speeds from the front and rear wheel rpm sensors 12a, 12b, 17a and 17b. From these signals, the control unit 32 calculates an average front wheel rotational speed $N_F$ given by $N_F=(Nfr+Nfl)/2$, and an average rear wheel rotational speed $N_R$ given by $N_R=(Nrr+Nrl)/2$, as shown in FIG. 4B. Then, the control unit 32 finds the absolute value of the difference between the average front wheel rotational speed $N_F$ and the average rear wheel rotational speed $N_R$. If this absolute value of the rotational speed difference becomes equal to or greater than a predetermined value (M), and at the same time the center differential 7 is held in the released condition, then the control unit 32 commands the center differential restrain unit 26 to engage the clutch 29 by sending the control signal to the solenoid 23. In response to the control signal, the current supply to the solenoid 23 is gradually increased, and accordingly the center differential control valve 27 increases the oil pressure in the oil chamber 29a by moving the spool 27a downwards in FIG. 3. When the oil pressure in the oil chamber 29a becomes high, the clutch 29 is engaged, and the center differential 7 is locked so that its function is prevented. By locking the center differential 7, the center differential restrain unit 26 prevents a relative rotation between the front propeller shaft 21 and the rear propeller shaft 13. Therefore, the driving torque can be transmitted to the rear wheels 16a and 16b which are not stuck in the mire, and the vehicle can easily escape from the mire.

Figure 5:
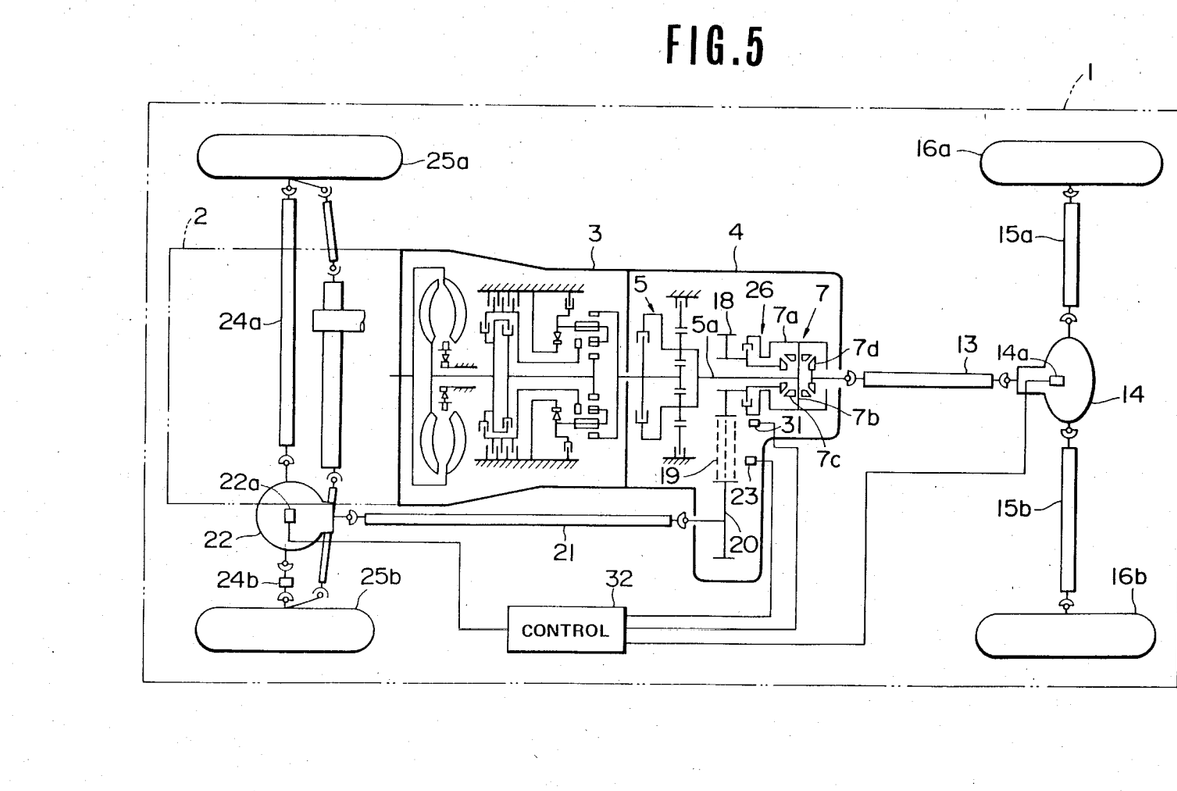
FIG. 5 is a schematic view of a four-wheel drive vehicle of a second embodiment of the present invention.
Figure 6:
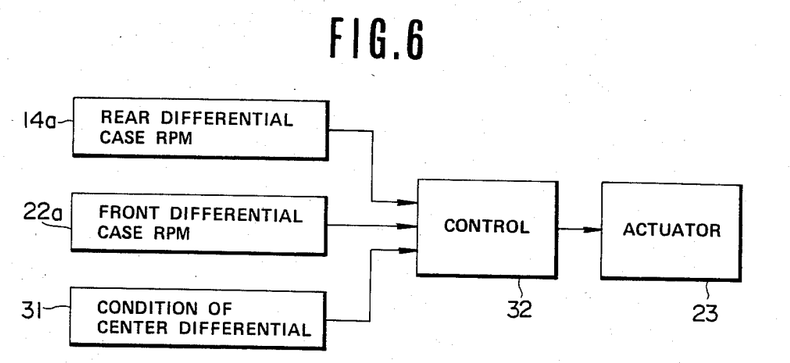
FIG. 6 is a block diagram of a control system of the second embodiment.

A second embodiment of the present invention is shown in FIGS. 5 and 6. In the second embodiment, the front wheel rpm sensors 12a and 12b and the rear wheel rpm sensors 17a and 17b are replaced by a front differential case rpm sensor 22a for sensing a rotational speed of a differential case of the front differential 22, and a rear differential case rpm sensor 14a for sensing a rotational speed of a differential case of the rear differential 14. Each of the front and rear differentials 22 and 14 has a differential case adapted to be driven by the engine 2 through the center differential 7, a pinion shaft fixed to the differential case, two differential pinion rotatably mounted on the pinion shaft and right and left side gears engaging with the pinions. In each of the front and rear differentials 22 and 14, the differential case rotates at a speed equal to one half the sum of the right and left wheel speeds, and the differential case is connected with the propeller shaft 21 or 13 through gears having a constant gear reduction ratio. Therefore, the control system of the second embodiment can determines a rotational speed difference between the front wheels and the rear wheels. As shown in FIG. 6, the control unit 32 is connected with the rear differential case rpm sensor 14a, the front differential case sensor 22a and the condition sensor 31. If the absolute value of the difference between the front differential case rotating speed and the rear differential rotating speed becomes equal to or greater than a predetermined value, and at the same time the center differential 7 is not locked, then the control unit 32 sends the control signal to the solenoid 23 and commands the center differential restrain unit 26 to engage the clutch 29 and to lock the center differential 7. In the second embodiment, the number of the required sensors is small so that the circuitry of the control unit 23 can be simplified as compared with the first embodiment.

Figure 7:
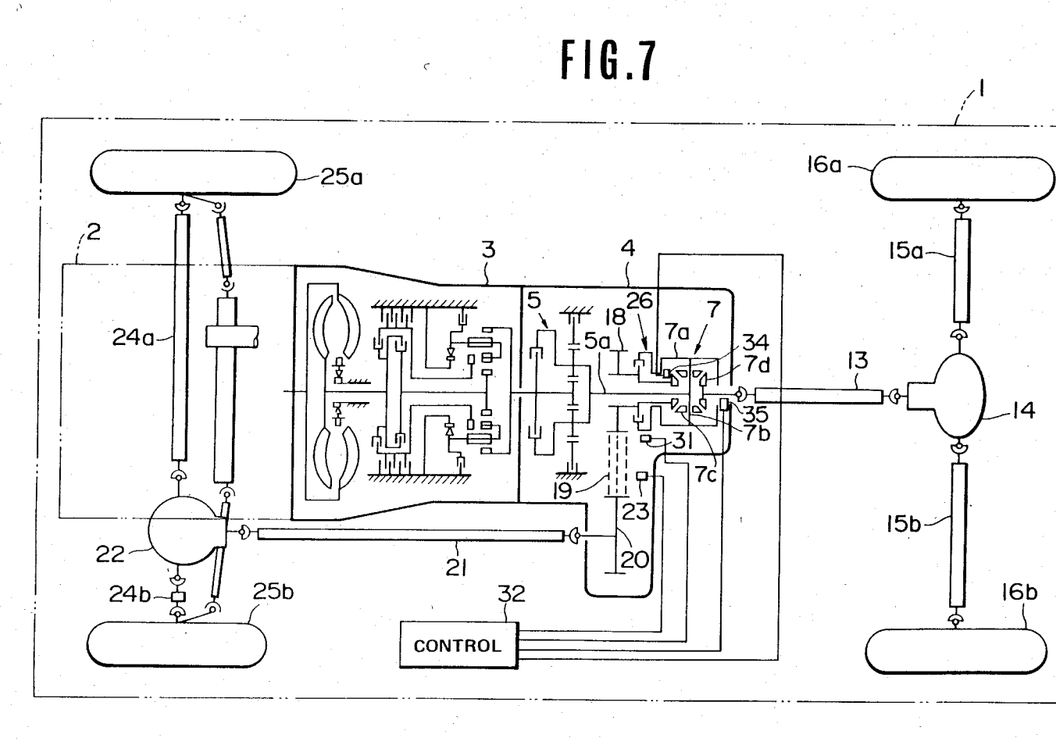
FIG. 7 is a schematic view of a four-wheel drive vehicle of a third embodiment of the present invention.
Figure 8:
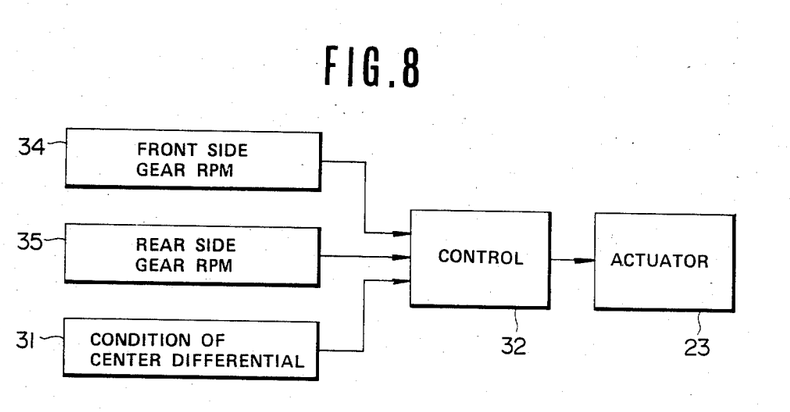
FIG. 8 is a block diagram of a control system of the third embodiment.

A third embodiment of the present invention is shown in FIGS. 7 and 8. In the third embodiment, there are provided a front side gear rpm sensor 34 for sensing a rotational speed of the front side gear 7d of the center differential 7, and a rear side gear rpm sensor 35 for sensing a rotational speed of the rear side gear 7d of the center differential 7, in place of the wheel rpm sensors of the first embodiment or the differential case rpm sensors of the second embodiment. The front side gear rpm sensor 34 is disposed near the shaft of the front side gear 7d which is connected with the front propeller shaft 21. The rear side gear rpm sensor 35 is disposed near the shaft of the rear side gear 7d which is connected with the rear propeller shaft 13. The control unit 32 of the third embodiment is connected with the front side gear rpm sensor 34, the rear side gear rpm sensor 35 and the condition sensor 31, as shown in FIG. 8. If the absolute value of the difference between rotational speeds of the front and rear side gears of the center differential 7 becomes equal to or greater than a predetermined value, and at the same time the center differential 7 is not locked, then the control unit 32 sends the control signal to the solenoid 23 and commands the center differential restrain unit 26 to engage the clutch 29 and to lock the center differential 7. In the third embodiment, the number of the required sensors is small, and the circuitry of the control unit 23 can be simplified as in the second embodiment.

Thus, the control system of the present invention automatically locks the center differential when at least one of the wheels begins slipping, and thereby makes the four-wheel drive vehicle very easy to control even for unskilled drivers.

What is claimed is:

1. A four-wheel drive vehicle comprising:
   an engine,
   a front right wheel, a front left wheel, a rear right wheel and a rear left wheel,
   a four-wheel drive system for transmitting power from said engine to said front wheels and said rear wheels, said four-wheel drive system comprising a center differential connected between said front wheels and said rear wheels for absorbing a rotational speed difference between said front wheels and said rear wheels, and restraining means capable of holding said center differential selectively in a restrained condition in which the differential action of said center differential is restrained, and in a released condition in which the differential action of said center differential is allowed, said four-wheel drive system further comprising front wheel side rotating means connected between said center differential and said front wheels for driving said front wheels and rear wheel side rotating means connected between said center differential and said rear wheels for driving said rear wheels, said center differential allowing said front wheel side rotating means and said rear wheel side rotating means to rotate at different speeds when said center differential is in the released condition, and a control system comprising:
front speed sensing means for sensing a rotational speed of said front wheel side rotating means,
rear speed sensing means for sensing a rotational speed of said rear wheel side rotating means,
condition sensing means for detecting whether said center differential is in or out of said restrained condition, and
control means, connected with both of said front and rear speed sensing means and said condition sensing means, for controlling said restraining means in accordance with signals of said front and rear speed sensing means and said condition sensing means, said control means commanding said restraining means to bring said center differential to the restrained condition if the difference between the rotational speed of said front wheel side rotating means and the rotational speed of said rear wheel side rotating means is equal to or larger than a predetermined value and at the same time said center differential is out of the restrained condition.

2. A vehicle according to claim 1, wherein said center differential comprises center input means adapted to be driven by said engine, and a pair of center front output means and center rear output means which are both driven by said center input means, said center front output means being connected with said front wheels for driving said front wheels and said center rear output means being connected with said rear wheels for driving said rear wheels, said center differential allowing said center front output means and said center rear output means to rotate at different speeds when said center differential is in the released condition.

3. A vehicle according to claim 2, wherein a relative rotation between said center front output means and said center rear output means is prevented by said restraining means when said center differential is in the restrained condition.

4. A vehicle according to claim 3, wherein said front wheel side rotating means comprises front right rotating means which is connected with said front right wheel so that said front right wheel and rotating means rotate together, and front left rotating means which is connected with said front left wheel so that said front left wheel and rotating means rotate together, and said rear wheel side rotating means comprises rear right rotating means which is connected with rear right wheel so that said rear right wheel and rotating means rotate together, and rear left rotating means which is connected with said rear left wheel so that said rear left wheel and rotating means rotate together, wherein said front speed sensing means comprises front right speed sensing means for sensing a rotational speed of said front right rotating means and front left speed sensing means for sensing a rotational speed of said front left rotating means, and said rear speed sensing means comprises rear right speed sensing means for sensing a rotational speed of said rear right rotating means and rear left speed sensing means for sensing a rotational speed of said rear left rotating means, and wherein said control means regards the rotational speed of said front wheel side rotating means as being equal to an average rotational speed of said front right rotating means and said front left rotating means, and regards the rotational speed of said rear wheel side rotating means as being equal to an average rotational speed of said rear right rotating means and said rear left rotating means.

5. A vehicle according to claim 4, wherein said front right, front left, rear right and rear left rotating means are axle shafts.

6. A vehicle according to claim 5, wherein said four-wheel drive system further comprises a front differential connected between said front right wheel and said front left wheel for allowing both to rotate at different speeds, and a rear differential connected between said rear right wheel and said rear left wheel for allowing both to rotate at different speeds.

7. A vehicle according to claim 6, wherein said center input means of said center differential comprises a center differential case and at least two pinions mounted on said center differential case, said center front output means being a center front side gear and said center rear output means is a center rear side gear, said center front and center rear side gears being in mesh with said pinions.

8. A vehicle according to claim 7, wherein said restraining means comprises a friction clutch disposed between said center differential case and said center front side gear, said clutch holding said center diffretial in the restrained condition when said clutcn is engaged, and in the released condition when said clutch is disengaged.

9. A vehicle according to claim 8, wherein said condition sensing means detects the condition of said center differential by detecting whether said clutch is engaged or disengaged.

10. A vehicle according to claim 9, wherein said clutch is operated by a fluid pressure, and said restraining means further comprises a solenoid valve for controlling the fluid pressure.

11. A vehicle according to claim 10, wherein said clutch holding said center differential in a condition intermediate between the restrained condition and the released condition when said clutch is slippingly engaged.

12. A vehicle according to claim 3, said drive system further comprises a front differential which comprises front input means connected with said center front output means, and a pair of front right output means and front left output means which are both driven by said center front output means through said front input means, said front right output means being connected with said front right wheel and said front left output means being connected with said front left wheel, said front differential being capable of allowing said front right output means and said front left output means to rotate at different speeds, and said drive system further comprises a rear differential which comprises rear input means connected with said center rear output means and a pair of rear right output means and rear left output means which are both driven by said center rear output means through said rear input means, said rear right output means being connected with said rear right wheel and said rear left output means being connected with said rear left wheel, said rear differential being capable of allowing said rear right output means and said rear left output means to rotate at different speeds, and wherein said front side rotating means is said front input means of said front differential, and said rear wheel side rotating means is said rear input means of said rear differential.

13. A vehicle according to claim 12, wherein said front input means of said front differential comprises a front differential case and at least two pinions mounted on said front differential case, said front right and front left output means being side gears which are in mesh with said pinions of said front differential, said rear input means of said rear differential comprising a rear differential case and at least two pinions mounted on said rear differential case, said rear right and rear left output means being side gears which are in mesh with said pinions of said rear differential, said front speed sensing means sensing a rotational speed of said front differential case and said rear speed sensing means sensing a rotational speed of said rear differential case.

14. A vehicle according to claim 3, wherein said front wheel side rotating means is said center front output means of said center differential, and said rear wheel side rotating means is said center rear output means of said center differential.

15. A vehicle according to claim 14, wherein said center input means of said center differential comprises a center differential case and at least two pinions mounted on said center differential case, said center front output means and said center rear output means being side gears meshing with said pinions.

16. A vehicle according to claim 15, wherein said front drive system further comprises a front differential which comprises front input means connected with said center front output means, and a pair of front right output means and front left output means which are both driven by said center front output means through said front input means, said front right output means being connected with said front right wheel and said front left output means being connected with said front left wheel, said front differential being capable of allowing said front right output means and said front left out means to rotate at different speeds, and said drive system further comprises a rear differential which comprises rear input means connected with said center rear output means and a pair of rear right output means and rear left output means which are both driven by said center rear output means through said rear input means, said rear right output means being connected with said rear right wheel and said rear left output means being connected with said rear left wheel, said rear differential being capable of allowing said rear right output means and said rear left output means to rotate at different speeds.

* * * * *